(12) United States Patent
Zehfuss

(10) Patent No.: US 11,136,055 B2
(45) Date of Patent: Oct. 5, 2021

(54) FOLDABLE STROLLER

(71) Applicant: DYNAMIC MOTION, LLC, Richmond, VA (US)

(72) Inventor: Mark Zehfuss, Glen Allen, VA (US)

(73) Assignee: DYNAMIC MOTION, LLC, Richmond, VA (US)

( * ) Notice: Subject to any disclaimer, the term of this patent is extended or adjusted under 35 U.S.C. 154(b) by 0 days.

(21) Appl. No.: 16/673,524

(22) Filed: Nov. 4, 2019

(65) Prior Publication Data

US 2021/0129886 A1 May 6, 2021

(51) Int. Cl.
*B62B 7/06* (2006.01)

(52) U.S. Cl.
CPC .......... *B62B 7/062* (2013.01); *B62B 2205/24* (2013.01)

(58) Field of Classification Search
CPC ............................................... B62B 7/06–062
See application file for complete search history.

(56) References Cited

U.S. PATENT DOCUMENTS

| | | | | |
|---|---|---|---|---|
| 3,796,439 A * | 3/1974 | Perego | ...................... | B62B 7/08 280/644 |
| 4,191,397 A * | 3/1980 | Kassai | ..................... | B62B 7/062 280/647 |
| 4,216,974 A * | 8/1980 | Kassai | ..................... | B62B 7/062 280/42 |
| 8,205,907 B2 * | 6/2012 | Chicca | ..................... | B62B 7/08 280/642 |
| 9,393,982 B2 * | 7/2016 | Tomasi | ..................... | B62B 7/06 |
| 10,167,008 B1 * | 1/2019 | Yang | ........................ | B62B 9/12 |
| 2005/0067813 A1 * | 3/2005 | Lin | ........................... | B62B 7/10 280/642 |
| 2006/0175803 A1 * | 8/2006 | Santoski | ................. | B62B 7/062 280/642 |
| 2006/0214396 A1 * | 9/2006 | Horacek | ................. | B62B 7/068 280/642 |
| 2008/0079240 A1 * | 4/2008 | Yeh | .......................... | B62B 7/08 280/642 |
| 2012/0032419 A1 * | 2/2012 | Li | ........................... | B62B 7/062 280/647 |
| 2012/0187660 A1 * | 7/2012 | Liao | ........................ | B62B 7/062 280/642 |

(Continued)

FOREIGN PATENT DOCUMENTS

CN 109484457 A 3/2019

OTHER PUBLICATIONS

International Search Report and Written Opinion received for International Application No. PCT/US2020/056816 dated Jan. 21, 2021, 9 pages.

*Primary Examiner* — Erez Gurari
(74) *Attorney, Agent, or Firm* — Bernard G. Pike, Pike IP Law.

(57) ABSTRACT

A foldable stroller comprises a folding mechanism to assist in folding of the stroller. Such a folding mechanism may be used to convert a stroller from an in-use configuration to a storage configuration. More specifically, the stroller comprises a stroller folding assembly that biases the stroller from the in-use configuration to the storage configuration by the force of gravity exerted on the handle. The stroller folding assembly has linkages that drive folding of the front wheel assembly and rear wheel assembly in response to rotation of the handle into the storage configuration from the in-use configuration.

16 Claims, 6 Drawing Sheets

(56) References Cited

U.S. PATENT DOCUMENTS

| | | | |
|---|---|---|---|
| 2013/0154215 A1* | 6/2013 | Thomas | B62B 9/18 |
| | | | 280/47.38 |
| 2015/0008659 A1* | 1/2015 | Chang | B62B 7/145 |
| | | | 280/650 |
| 2015/0042075 A1* | 2/2015 | Smith | B62B 7/062 |
| | | | 280/650 |
| 2015/0076794 A1* | 3/2015 | Driessen | B62B 7/145 |
| | | | 280/642 |
| 2015/0353115 A1* | 12/2015 | Zheng | B62B 9/203 |
| | | | 280/47.371 |
| 2016/0185376 A1* | 6/2016 | He | B62B 7/08 |
| | | | 280/650 |
| 2017/0144687 A1* | 5/2017 | Li | B62B 7/062 |
| 2017/0217470 A1* | 8/2017 | Popp | B62B 7/064 |
| 2017/0267272 A1* | 9/2017 | Gao | B62B 7/08 |
| 2018/0022372 A1* | 1/2018 | Oakes | B62B 7/062 |
| | | | 280/642 |
| 2018/0065654 A1* | 3/2018 | Chen | B62B 7/08 |
| 2018/0215405 A1* | 8/2018 | Lin | B62B 7/08 |
| 2019/0351929 A1* | 11/2019 | Williams | B62B 7/062 |
| 2020/0239053 A1* | 7/2020 | Holleis | B60N 2/2848 |
| 2020/0353967 A1* | 11/2020 | Horst | B62B 9/20 |

\* cited by examiner

FOLDABLE STROLLER

TECHNICAL FIELD

The invention is directed to a folding mechanism for a stroller, single stroller and double strollers (hereinafter "stroller" or "strollers"). Such a folding mechanism may be used to convert a stroller from an in-use configuration to a storage configuration. More specifically, embodiments of the stroller comprise a stroller folding assembly that biases the stroller from the in-use configuration to the storage configuration by the force of gravity exerted on the handle. The stroller folding assembly comprises linkages that drive folding of the front wheel assembly and rear wheel assembly in response to rotation of the handle into the storage configuration from the in-use configuration.

BACKGROUND

A typical stroller has at least a handle assembly for pushing the stroller, a front wheel assembly, and a rear wheel assembly. Many strollers may be converted from an in-use configuration for carrying a baby or toddler to a folded storage configuration. The folded storage configuration may be a more compacted configuration to allow more convenient storage or transport of the stroller. Foldable stroller that includes a folding and latching mechanism having biasing means that increases the ease with which the stroller may be deployed for use and folded for storage.

Foldable strollers typically have a stroller locking mechanism that has a locked position and the unlocked position. In the locked position, the stroller is maintained in the in-use configuration. If the stroller locking mechanism is switched from the locked position to the unlocked position, the stroller may be moved from the in-use configuration to the storage configuration.

Once unlocked, the stroller may be moved by various biasing forces. In some foldable stroller must be forced into the folded configuration by a person that must exert a driving force on the stroller frame, typically on at least two of handle assembly, the front wheel assembly, the rear wheel assembly. The stroller may also be biased to the folded configuration by lifting the stroller and allowing gravity to work on all three of the frame components.

In other embodiment, springs may be incorporated into the folding assembly to bias the stroller into the folded configuration.

There is a need for a foldable stroller that can be folded using a simple, one-handed operation which releases the latch, folds the stroller frame in a coordinated manner through a folding pivot assembly comprising linkages that coordinate the folding of the stroller.

There is a further need for a foldable stroller that comprises a folding pivot assembly that comprises linkages that rotate the front wheel assembly toward the rear wheel assembly and the rear wheel assembly toward the front wheel assembly as the handle assembly is rotated toward the rear wheel assembly. There is a still further need for a foldable stroller that comprises a folding pivot assembly that comprises linkages that rotate the front wheel assembly toward the rear wheel assembly and the rear wheel assembly toward the front wheel assembly as the handle assembly is rotated toward the rear wheel assembly by the force of gravity without lifting the stroller.

SUMMARY OF THE INVENTION

Embodiments of the foldable strollers described herein, may provide one or more of the following advantages.

According to one embodiment of the present invention, a stroller having forwardly extending right and left side front wheel assemblies with at least one forwardly disposed wheel connector, rearwardly extending right and left side rear wheel assemblies with rearwardly disposed wheel connectors, and upwardly extending right and left side handle assemblies terminating in one or more handles at the upper end are interconnected by right and left side stroller pivot assemblies to form a collapsible or foldable stroller frame. In some embodiments, the foldable stroller comprises a folding pivot assembly. In some embodiments, a folding mechanism of the stroller comprises the stroller pivot assembly and the folding pivot assembly. The folding mechanisms allow movement of respective front wheel assembly, rear wheel assembly, and handle assembly as the stroller frame is moved between in-use configuration and the storage configuration and may provide a locking mechanism to maintain the frame in at least the in-use configuration until selectively released.

Embodiments of the stroller comprise a handle assembly, a front wheel assembly and a rear wheel assembly. The handle assembly may comprise an upper handle member and a lower handle member, wherein the upper handle member comprises a handle portion for holding and pushing the stroller.

The front wheel assembly may comprise at least one front wheel support tube and at least one front wheel. Similarly, the rear wheel assembly may comprise at least one rear wheel support tube at least one rear wheel. In some embodiments, the wheel assemblies will comprise frame tubes extending from the stroller pivot assembly to the wheels or wheel connection assembly. The handle assembly may also comprise frame tube members connected to form a handle.

The handle assembly may also comprise a handle pivot assembly, wherein the handle pivot assembly pivotally connects the upper handle member to the lower handle member, the upper handle member selectively rotatable about a handle axis point between an in-use position and a storage position. The handle pivot assembly comprises a locking assembly that retains the handle in the in-use position. The locking assembly may comprise a biased pin in one of the upper handle assembly and the lower handle member that is biased into a recess in the other of the upper handle assembly and the lower handle member. The biased pin may be extracted from the recess by a mechanism in the handle assembly by movement of a switch or pressing a button, for example.

The stroller pivot assembly coordinates folding of the front wheel assembly, the rear wheel assembly and the handle assembly about a stroller folding axis. In an embodiment, the stroller pivot assembly rotatably connects the lower handle member of the handle assembly, the front wheel assembly. The handle assembly, the front wheel assembly and the rear wheel assembly may rotate from a stroller in-use position to a stroller storage position. The stroller pivot assembly may further comprise a stroller locking assembly having an unlocked position and a locked position that retains the stroller in the stroller in-use position.

Embodiments of the foldable stroller may comprise a folding pivot assembly that coordinates folding and links the rotation of the front wheel assembly, rear wheel assembly, and handle assembly so that all of the front wheel assembly, rear wheel assembly, and handle assembly move from the in-use configuration to the storage configuration at the same time. Also, in another embodiment, the folding pivot assembly coordinates unfolding and links front wheel assembly, rear wheel assembly, and handle assembly. In such embodiments, the folding pivot assembly may comprise a handle assembly linkage, a front wheel assembly linkage, and a rear wheel assembly linkage, wherein rotation of the lower handle member by the force of gravity drives the handle assembly linkage to rotate the front wheel linkage and the rear wheel linkage to rotate the front wheel assembly toward the rear wheel assembly.

In a particular embodiment, the stroller locking assembly comprises a rotation of the upper handle member about the handle axis point moves the stroller locking assembly from the locked position to the unlocked position. The locking and unlocking of the stroller locking assembly may be linked to the rotation of the upper handle assembly. For example, forward rotation of the upper handle member moves the stroller locking assembly from the locked position to the unlocked position allowing the stroller to be folded.

In another embodiment, the foldable stroller may comprise a folding pivot assembly, wherein the folding pivot assembly comprises a handle assembly linkage, a front wheel assembly linkage, and a rear wheel assembly linkage that cooperate to move the front wheel assembly toward the rear wheel assembly as the handle assembly is rotated from in-use configuration to the storage configuration.

The stroller pivot assembly may comprise an axis, wherein the stroller pivot assembly rotatably connects the handle assembly, the front wheel assembly, the handle assembly to rotate about the axis from an in-use position to a storage position and the stroller pivot assembly comprises a stroller locking assembly having an unlocked position and a locked position that retains the stroller in the stroller in-use position. In such embodiments, the rotation of at least a portion of the handle assembly by the force of gravity drives the handle assembly linkage to rotate the front wheel linkage and the rear wheel linkage to rotate the front wheel assembly toward the rear wheel assembly.

The foldable stroller may further comprise a stroller seat having an articulated seat frame. The articulated seat frame comprises a backrest assembly and a seat assembly rotatably connected to each other at a stroller seat joint. The stroller seat joint allows the backrest assembly to rotate and recline relative to the seat assembly and allows folding of the stroller seat from the in-use configuration to the storage configuration. The folding mechanism may comprise a seat linkage that drives and coordinates the folding of the articulated seat frame with the front wheel assembly, the rear wheel assembly, and the handle assembly. The seat linkage is configured to rotate the seat assembly substantially into alignment with the front wheel support tube. The articulated seat frame includes a transverse pivot intermediately disposed between the seat frame and backseat frame.

Aspects of the stroller are presented in various embodiments, however one skilled in the art will understand various variation and interchangeability of the components of the various embodiments which are intended to be included in the scope of the invention.

DESCRIPTION

Figure 1:
FIG. 1 depicts an embodiment of a foldable stroller in the in-use configuration.

Embodiments of the foldable strollers described herein, may provide one or more of the following advantages. According to one embodiment of the present invention, a stroller having forwardly extending right and left side front wheel assemblies with at least one forwardly disposed wheel connector, rearwardly extending right and left side rear wheel assemblies with rearwardly disposed wheel connectors, and upwardly extending right and left side handle assemblies terminating in one or more handles at the upper end are interconnected by right and left side stroller pivot assemblies to form a collapsible or foldable stroller frame. In some embodiments, the foldable stroller comprises a folding pivot assembly. In some embodiments, a folding mechanism of the stroller comprises the stroller pivot assembly and the folding pivot assembly. The folding mechanisms allow movement of respective front wheel assembly, rear wheel assembly, and handle assembly as the stroller frame is moved between in-use configuration and the storage configuration and may provide a locking mechanism to maintain the frame in at least the in-use configuration until selectively released.

Embodiments of the stroller comprise a handle assembly, a front wheel assembly and a rear wheel assembly. The handle assembly may comprise an upper handle member and a lower handle member, wherein the upper handle member comprises a handle portion for holding and pushing the stroller.

The front wheel assembly may comprise at least one front wheel support tube and at least one front wheel. Similarly, the rear wheel assembly may comprise at least one rear wheel support tube at least one rear wheel. In some embodiments, the wheel assemblies will comprise frame tubes extending from the stroller pivot assembly to the wheels or wheel connection assembly. The handle assembly may also comprise frame tube members connected to form a handle.

The handle assembly may also comprise a handle pivot assembly, wherein the handle pivot assembly pivotally connects the upper handle member to the lower handle member, the upper handle member selectively rotatable about a handle axis point between an in-use position and a storage position. The handle pivot assembly comprises a locking assembly that retains the handle in the in-use position. The locking assembly may comprise a biased pin in one of the upper handle assembly and the lower handle member that is biased into a recess in the other of the upper handle assembly and the lower handle member. The biased pin may be extracted from the recess by a mechanism in the handle assembly by movement of a switch or pressing a button, for example.

The stroller pivot assembly coordinates folding of the front wheel assembly, the rear wheel assembly and the handle assembly about a stroller folding axis. In an embodiment, the stroller pivot assembly rotatably connects the lower handle member of the handle assembly, the front wheel assembly. The handle assembly, the front wheel assembly and the rear wheel assembly may rotate from a stroller in-use position to a stroller storage position. The stroller pivot assembly may further comprise a stroller locking assembly having an unlocked position and a locked position that retains the stroller in the stroller in-use position.

Embodiments of the foldable stroller may comprise a folding pivot assembly that coordinates folding and links the rotation of the front wheel assembly, rear wheel assembly, and handle assembly so that all of the front wheel assembly, rear wheel assembly, and handle assembly move from the in-use configuration to the storage configuration at the same time. Also, in another embodiment, the folding pivot assembly coordinates unfolding and links front wheel assembly, rear wheel assembly, and handle assembly. In such embodiments, the folding pivot assembly may comprise a handle assembly linkage, a front wheel assembly linkage, and a rear wheel assembly linkage, wherein rotation of the lower handle member by the force of gravity drives the handle assembly linkage to rotate the front wheel linkage and the rear wheel linkage to rotate the front wheel assembly toward the rear wheel assembly.

In a particular embodiment, the stroller locking assembly comprises a rotation of the upper handle member about the handle axis point moves the stroller locking assembly from the locked position to the unlocked position. The locking and unlocking of the stroller locking assembly may be linked to the rotation of the upper handle assembly. For example, forward rotation of the upper handle member moves the stroller locking assembly from the locked position to the unlocked position allowing the stroller to be folded.

In another embodiment, the foldable stroller may comprise a folding pivot assembly, wherein the folding pivot assembly comprises a handle assembly linkage, a front wheel assembly linkage, and a rear wheel assembly linkage that cooperate to move the front wheel assembly toward the rear wheel assembly as the handle assembly is rotated from in-use configuration to the storage configuration.

The stroller pivot assembly may comprise an axis, wherein the stroller pivot assembly rotatably connects the handle assembly, the front wheel assembly, the handle assembly to rotate about the axis from an in-use position to a storage position and the stroller pivot assembly comprises a stroller locking assembly having an unlocked position and a locked position that retains the stroller in the stroller in-use position. In such embodiments, the rotation of at least a portion of the handle assembly by the force of gravity drives the handle assembly linkage to rotate the front wheel linkage and the rear wheel linkage to rotate the front wheel assembly toward the rear wheel assembly.

The foldable stroller may further comprise a stroller seat having an articulated seat frame. The articulated seat frame comprises a backrest assembly and a seat assembly rotatably connected to each other at a stroller seat joint. The stroller seat joint allows the backrest assembly to rotate and recline relative to the seat assembly and allows folding of the stroller seat from the in-use configuration to the storage configuration. The folding mechanism may comprise a seat linkage that drives and coordinates the folding of the articulated seat frame with the front wheel assembly, the rear wheel assembly, and the handle assembly. The seat linkage is configured to rotate the seat assembly substantially into alignment with the front wheel support tube. The articulated seat frame includes a transverse pivot intermediately disposed between the seat frame and backseat frame.

A side view of an embodiment a foldable stroller 1 in the in-use configuration is shown in FIG. 1. As a note, FIG. 1 shows only one side of the foldable stroller 1, however, most components include a complementary component on the other side of the single stroller but are not necessarily shown in FIG. 1. The foldable stroller 1 comprises a frame 11 that supports stroller seat 8. The frame 11 may, optionally, include at least one, preferably two, folding mechanism 12 that allows the stroller 1 to be folded to a more convenient size for storing or transporting the stroller 1.

In this embodiment, the stroller seat 8 is shown as a typical stroller seat, however, other types of seats may be connected to the stroller 1. The stroller seat 8 may be permanently affixed to the frame 11 or releasably connected such that it is capable of being removed and substituted with a different seat. As used herein, "releasably connected" or "releasably attached" means the connection is not a permanent connection and that the connection is capable being of connected and disconnected by the user of the stroller without requiring special tools or special skills. Releasable connections include, but are not limited to, buttons, snaps, friction fittings, interference fits, threaded connections, locking tabs, keyed connections, other fasteners, or the like. On stroller 1 of FIG. 1, the frame 11 is supported on a pair of rear wheels 41 and a pair of front wheels 31. In this embodiment, rear wheels 41 are fixed and do not swivel or pivot on the frame. The pair of front wheels 31 on the foldable stroller 1 pivot to make turning the foldable stroller 1 easier and more convenient. Though, pivoting wheels may be preferred in certain strollers, strollers with fixed non-pivoting wheels are also common. It should be noted that a single stroller does not require pairs of front or rear wheels and either the front wheels 31 or the rear wheels 41 may be substituted with a single wheel. Conventionally, many single strollers, including umbrella strollers, jogging strollers, all-terrain strollers, as well as other strollers may only include one front wheel. Embodiments of the folding mechanism, assemblies and linkages may be capable of being utilized on any stroller or other foldable device.

Figure 2:
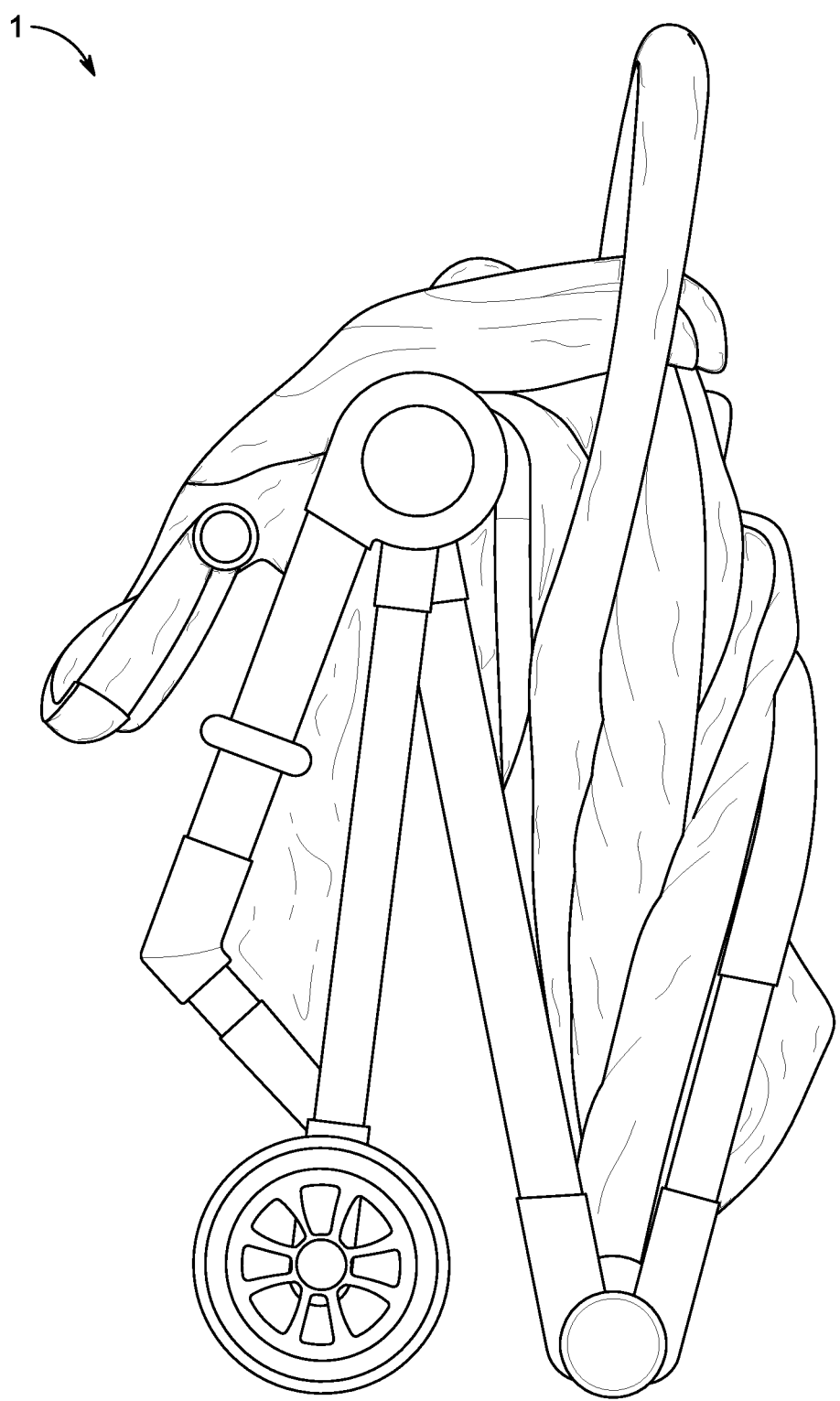
FIG. 2 depicts an embodiment of a foldable stroller in the storage configuration.

The embodiment of the foldable stroller 1 of FIG. 1 is shown in FIG. 2 in the folded storage configuration. The stroller 1 comprises a frame assembly 11. The stroller 1 comprises a canopy, under seat basket, and fabric covering the seat frame. The embodiment of the stroller 1 has forwardly extending front wheel assembly 3 with at least one forwardly disposed wheel connector, rearwardly extending rear wheel assembly 4 with rearwardly disposed wheel connectors, and upwardly extending handle assembly 2 having a handle portion 23 at the upper end of the handle. The stroller 1 has a stroller pivot assembly 6 that rotatably connects the handle assembly 2, the front wheel assembly 3, and the rear wheel assembly 4 such that the handle assembly 2, the front wheel assembly 3, and the rear wheel assembly 4 pivot around handle axis point HA.

The right and left side stroller pivot assemblies 6 coordinate rotational movement so the stroller 1 may be folded from the in-use configuration to the storage configuration. In some embodiments, the stroller 1 comprises folding mechanism having a folding pivot assembly 7. The folding mechanisms allow movement of respective front wheel assembly 3, rear wheel assembly 4, and handle assembly 2 as the stroller frame 11 is moved between in-use configuration and the storage configuration and may provide a locking mechanism to maintain the frame in at least the in-use configuration until selectively released.

Embodiments of the stroller 1 comprise a handle assembly. The handle assembly 2 may comprise an upper handle member 21 and a lower handle member 22, wherein the upper handle member 22 comprises a handle portion 23 for holding and pushing the stroller.

The front wheel assembly may comprise at least one front wheel support tube and at least one front wheel. Similarly, the rear wheel assembly may comprise at least one rear wheel support tube at least one rear wheel. In some embodiments, the wheel assemblies will comprise frame tubes extending from the stroller pivot assembly to the wheels or wheel connection assembly. The handle assembly may also comprise frame tube members connected to form a handle.

The handle assembly may also comprise a handle pivot assembly, wherein the handle pivot assembly pivotally connects the upper handle member to the lower handle member, the upper handle member selectively rotatable about a handle axis point between an in-use position and a storage position. The handle pivot assembly comprises a locking assembly that retains the handle in the in-use position. The locking assembly may comprise a biased pin in one of the upper handle assembly and the lower handle member that is biased into a recess in the other of the upper handle assembly and the lower handle member. The biased pin may be extracted from the recess by a mechanism in the handle assembly by movement of a switch or pressing a button, for example.

The stroller pivot assembly coordinates folding of the front wheel assembly, the rear wheel assembly and the handle assembly about a stroller folding axis. In an embodiment, the stroller pivot assembly rotatably connects the lower handle member of the handle assembly, the front wheel assembly. The handle assembly, the front wheel assembly and the rear wheel assembly may rotate from a stroller in-use position to a stroller storage position. The stroller pivot assembly may further comprise a stroller locking assembly having an unlocked position and a locked position that retains the stroller in the stroller in-use position.

Embodiments of the foldable stroller may comprise a folding pivot assembly that coordinates folding and links the rotation of the front wheel assembly, rear wheel assembly, and handle assembly so that all of the front wheel assembly, rear wheel assembly, and handle assembly move from the in-use configuration to the storage configuration at the same time. Also, in another embodiment, the folding pivot assembly coordinates unfolding and links front wheel assembly, rear wheel assembly, and handle assembly. In such embodiments, the folding pivot assembly may comprise a handle assembly linkage, a front wheel assembly linkage, and a rear wheel assembly linkage, wherein rotation of the lower handle member by the force of gravity drives the handle assembly linkage to rotate the front wheel linkage and the rear wheel linkage to rotate the front wheel assembly toward the rear wheel assembly.

In a particular embodiment, the stroller locking assembly comprises a rotation of the upper handle member about the handle axis point moves the stroller locking assembly from the locked position to the unlocked position. The locking and unlocking of the stroller locking assembly may be linked to the rotation of the upper handle assembly. For example, forward rotation of the upper handle member moves the stroller locking assembly from the locked position to the unlocked position allowing the stroller to be folded.

In another embodiment, the foldable stroller may comprise a folding pivot assembly, wherein the folding pivot assembly comprises a handle assembly linkage, a front wheel assembly linkage, and a rear wheel assembly linkage that cooperate to move the front wheel assembly toward the rear wheel assembly as the handle assembly is rotated from in-use configuration to the storage configuration.

The stroller pivot assembly may comprise an axis, wherein the stroller pivot assembly rotatably connects the handle assembly, the front wheel assembly, the handle assembly to rotate about the axis from an in-use position to a storage position and the stroller pivot assembly comprises a stroller locking assembly having an unlocked position and a locked position that retains the stroller in the stroller in-use position. In such embodiments, the rotation of at least a portion of the handle assembly by the force of gravity drives the handle assembly linkage to rotate the front wheel linkage and the rear wheel linkage to rotate the front wheel assembly toward the rear wheel assembly.

The foldable stroller may further comprise a stroller seat having an articulated seat frame. The articulated seat frame comprises a backrest assembly and a seat assembly rotatably connected to each other at a stroller seat joint. The stroller seat joint allows the backrest assembly to rotate and recline relative to the seat assembly and allows folding of the stroller seat from the in-use configuration to the storage configuration. The folding mechanism may comprise a seat linkage that drives and coordinates the folding of the articulated seat frame with the front wheel assembly, the rear wheel assembly, and the handle assembly. The seat linkage is configured to rotate the seat assembly substantially into alignment with the front wheel support tube. The articulated seat frame includes a transverse pivot intermediately disposed between the seat frame and backseat frame.

The frame comprises support frame tubes. The stroller 1 may further comprise a handle pivot assembly 5, wherein the handle pivot assembly 5 pivotally connects the upper handle member 21 to the lower handle assembly 22, the upper handle member 22 may be selectively rotatable about a handle axis point HA between an in-use position and a storage position, and handle pivot assembly 5 comprises a locking assembly 51 that retains the handle assembly 2 in the in-use position.

The stroller a stroller pivot assembly 6, wherein the stroller pivot assembly rotatably connects the lower handle member 22 of the handle assembly 2, the front wheel assembly 3, and the rear wheel assembly 4 such that may rotate from the in-use position to a stroller storage position. The stroller pivot assembly 6 may comprise a stroller locking assembly 62 having an unlocked position and a locked position, wherein the stroller pivot assembly 6 in the locked position retains the stroller in the stroller in-use position.

In embodiments of the stroller 1, forward rotation of the upper handle member 21 causes the stroller locking assembly 62 to move from the locked position to the unlocked position resulting in folding of the stroller 1 from the in-use configuration to the storage configuration. In one embodiment, a release wire may be attached to the upper handle member 22 and extend down a tube in the lower handle member 22 to the stroller locking assembly 62. Rotation of the upper handle member 22 causes the release wire to be pulled though the lower handle member 22 and to release the stroller locking assembly 62 by pulling a pin, for example.

Once the stroller locking assembly 62 is unlocked, the weight of the handle assembly results in clockwise rotation of the handle assembly (as seen from the angle of FIG. 1) and results in a coordinated movement of the linkages in the folding pivot assembly 7. An embodiment of the folding pivot assembly 7 comprises a handle assembly linkage 71 connected to the handle assembly; a rear wheel assembly linkage 73 connected to the handle assembly linkage 71, the rear wheel assembly 4, and the front wheel assembly linkage 72; a front wheel assembly linkage 72 connected between the rear wheel assembly linkage 73 and the front wheel assembly 3.

Figure 6:
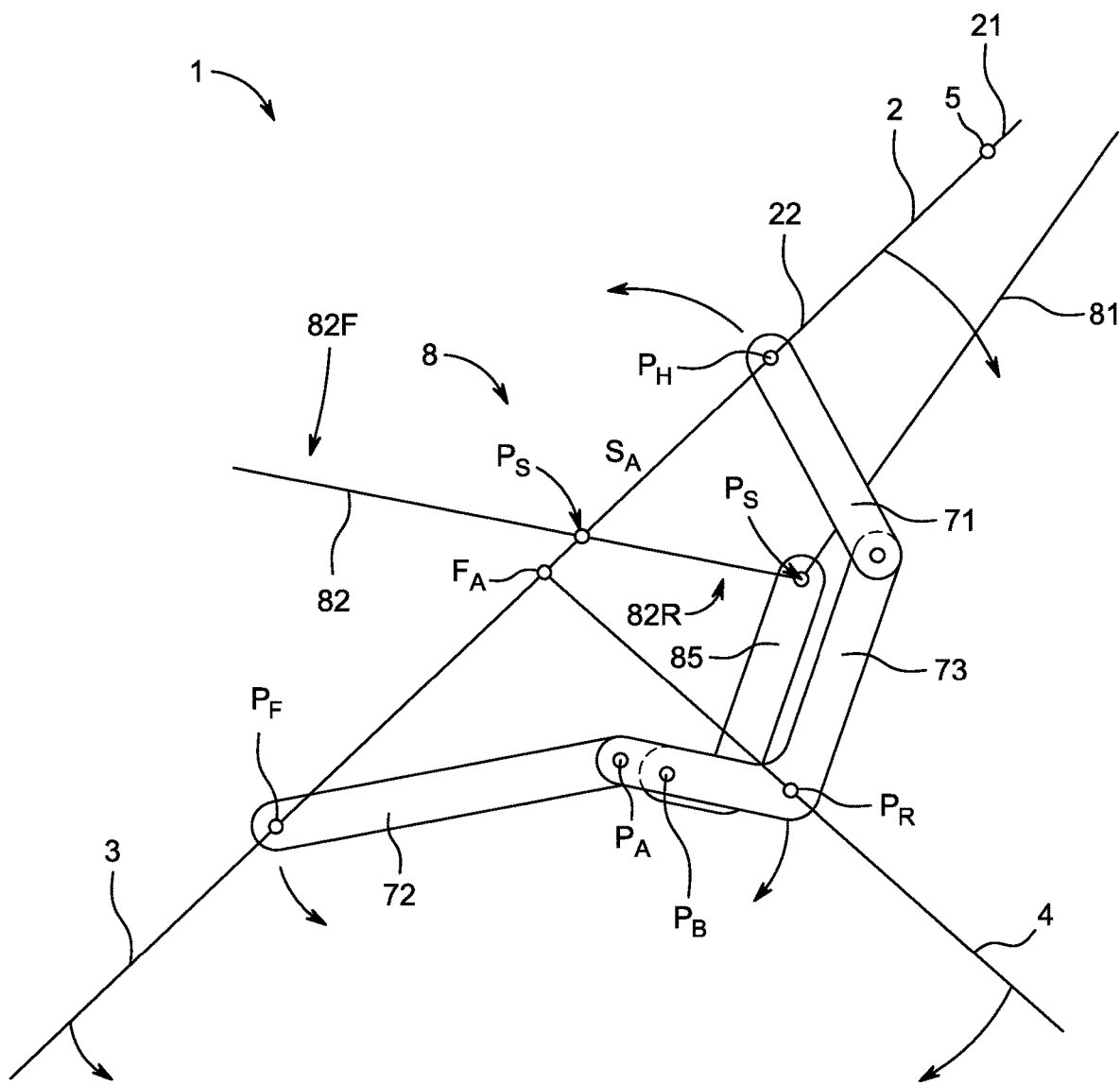
FIG. 6 depicts an embodiment of the folding pivot assembly comprising a handle assembly linkage, a front wheel assembly linkage, a rear wheel assembly linkage, and a seat assembly linkage for coordinating a folding of the stroller.

Thus, in an embodiment of the stroller, rotation of the handle assembly 2 by the force of gravity drives the folding pivot assembly 7 to coordinate folding of the front wheel assembly 3 and the rear wheel assembly 4. In the embodiment shown in FIG. 6, the handle assembly linkage 71 drops with the handle assembly 2, the handle assembly linkage 71 drives the rear wheel assembly linkage 73 to rotate about the rear wheel pivot axis PR. As the rear wheel assembly linkage 73 connected to the handle assembly linkage 71 rotates counterclockwise (as seen in FIG. 6) the other end of the rear wheel assembly linage 73 drives pivot point PA upward and reducing the distance between rear wheel assembly pivot point PR and front wheel assembly pivot point PF, thus urging front wheel assembly 3 toward the rear wheel assembly 4 from the in-use configuration to the storage configuration. In the embodiment, the rear wheel assembly linkage 73 comprises an L-shaped portion. The L-shaped portion may provide leverage for the rear wheel assembly linkage 73 to rotate the front wheel assembly linkage 72.

The rear wheel assembly 4 and the front wheel assembly 3 are rotated toward each other by the folding pivot assembly 7 with the front wheel and the rear wheel are resting on a rolling surface. The front wheel assembly 3 and the rear wheel assembly 2 are driven into the storage configuration by the weight of the handle assembly and the force transmitted through the folding pivot assembly 7. The weight of the handle assembly 2 is sufficient to fold the stroller 1 through the linkages without lifting the stroller. In fact, in some embodiments, the handle portion 23 may be released after the stroller pivot locking assembly 61 is moved to the unlocked position and the lower handle member 22 begins to rotate in the clockwise direction by the force of gravity.

Figure 3:
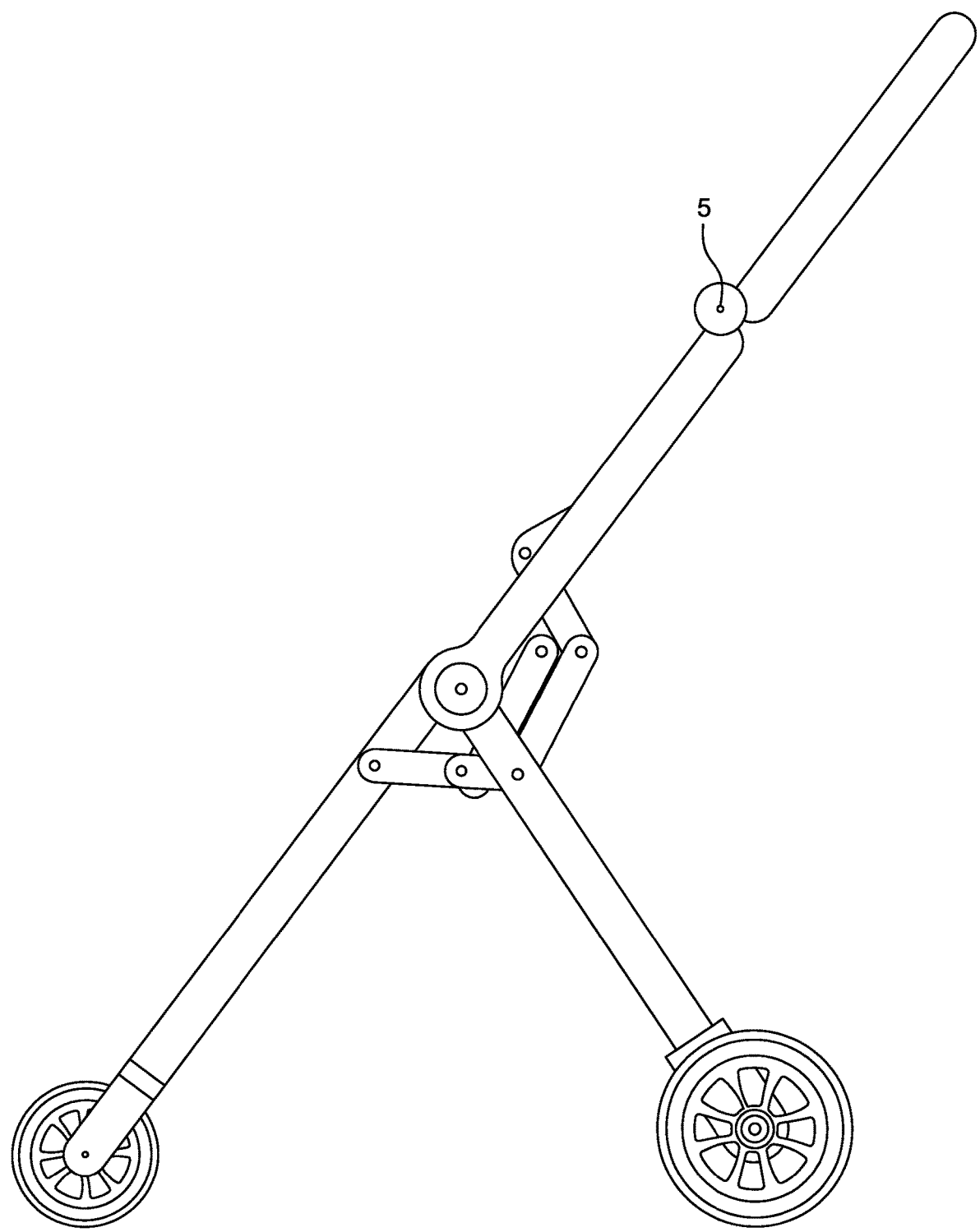
FIG. 3 depicts a stroller comprising a folding pivot assembly comprising a handle assembly linkage, a front wheel assembly linkage, and a rear wheel assembly linkage.
Figure 4:
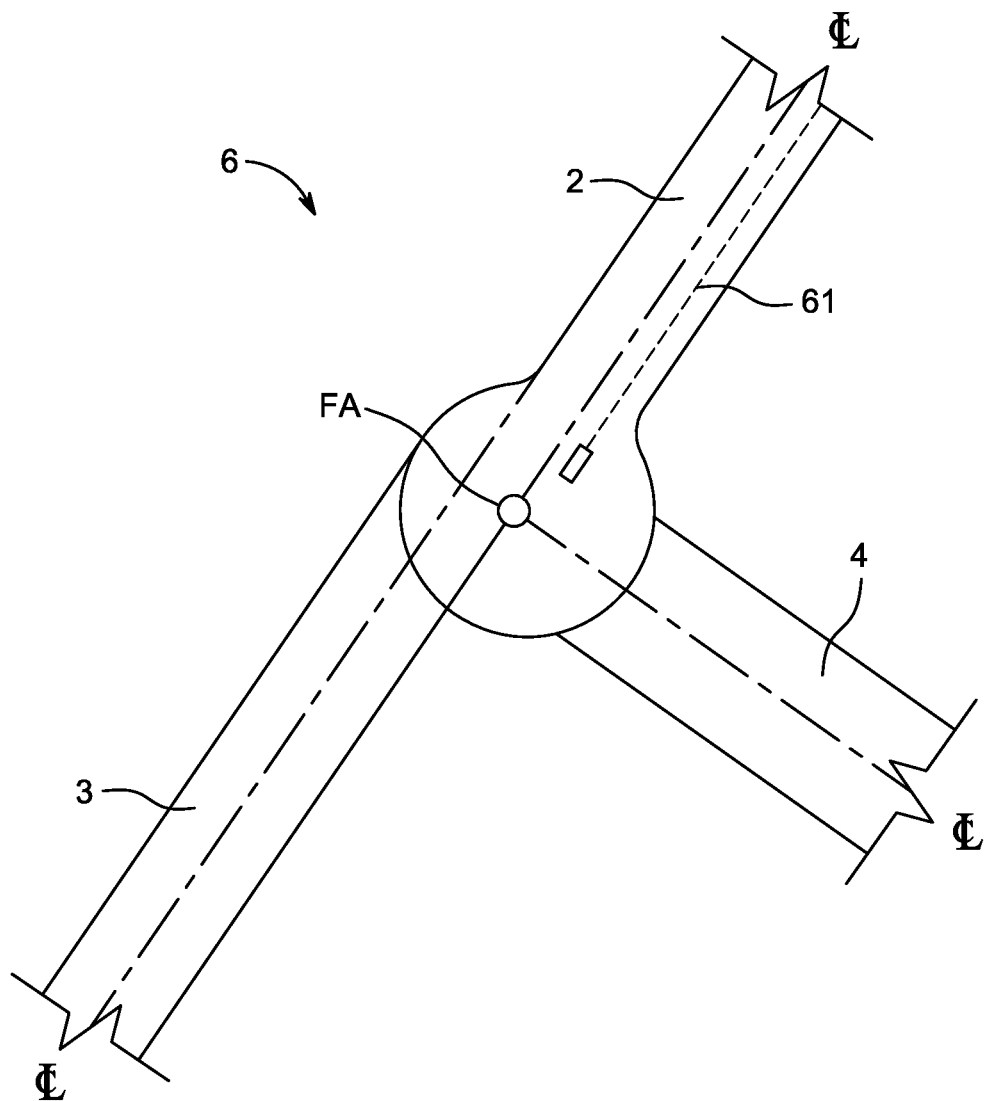
FIG. 4 depicts an embodiment of a stroller pivot assembly rotatably connecting the handle assembly, the front wheel assembly, and the rear wheel assembly of FIG. 1.
Figure 5:
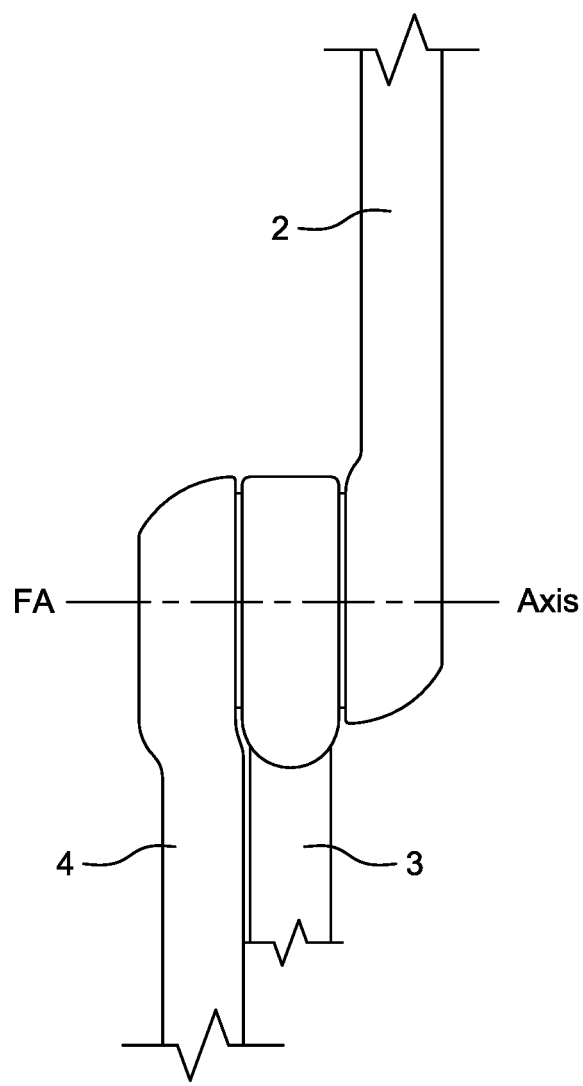
FIG. 5 depicts a front view of stroller pivot assembly of FIG. 4.

The lower handle member 22 of the handle assembly 2, the front wheel assembly 3, and the rear wheel assembly 4 each comprise a frame tube that is connected to the stroller pivot assembly as shown in FIG. 4. In order for the storage configuration of the stroller 1 to be more compact configuration in the width dimension, the longitudinal centerline of at least one of the tubes that are connected to the stroller pivot assembly 6 may be offset from the folding pivot axis FA. In one embodiment as shown in FIGS. 3 and 4, a longitudinal center line CL of the front wheel assembly 3. In this embodiment, the longitudinal centerlines of the handle assembly 2 and the rear wheel assembly 4 intersect at the folding pivot axis. In this embodiment, all of the handle assembly 2, the front wheel assembly 3, and the rear wheel assembly 4 all rotate about the same axis such as the folding pivot axis FA.

Embodiments of the stroller comprise a stroller seat 8. In certain embodiments, the folding pivot assembly 7 may further comprise a stroller seat assembly linkage 74. The stroller seat assembly linkage 74 may be rotatably connected to at least one of the front wheel assembly linkage 72 and the rear wheel assembly linkage 73. In the embodiment of the stroller 1 shown in the figures, the stroller seat 82 has a front seat portion 82F and a rear seat portion 82R. The stroller seat assembly linkage 74 is rotatably connected to the rear seat portion 82R. As the handle assembly 2 is rotated clockwise, the rear wheel assembly linkage is rotated about the rear wheel assembly pivot axis PR, one end of the stroller seat assembly linkage 74 is raised and aligns the stroller seat pivot axis PS closer to the handle assembly 2. The articulated seat backrest 81 may then be folded to align with the tube of the lower handle member 22. The stroller seat assembly linkage 74 may comprise an L-shaped portion as shown in FIG. 6.

The stroller seat assembly linkage 74 is rotatably connected to the rear portion 82R of stroller seat 82 to properly rotate the stroller seat 82 from its folded position to its in-use position.

In embodiments, rotation of the upper handle member 22 about the handle axis point PH moves the stroller locking assembly 61 from the locked position to the unlocked position. The rotation of the upper handle member 22 may pull a release wire or release rod inside a tube of the lower handle member 21 to move the stroller locking assembly 22 from the locked position to the unlocked position, thus releasing the lower handle assembly 21 to be biased by gravity and activate the folding pivot assembly 7 to fold the stroller to the storage configuration. The handle assembly linkage 71 is rotatably connected to lower handle member 21 and thus move with the lower handle member when the stroller locking assembly 61 is unlocked. The force of gravity is not assisted or enhanced by mechanical biasing force such as by a spring or other mechanical biasing member. Further, the leverage provided by the folding pivot assembly 7 on the front wheel assembly 3 and the rear wheel assembly 4 is sufficient to move the stroller to the folded storage configuration without lifting either the front or rear wheels off the support surface. The support surface is any surface that the stroller had been rolling upon such as but not limited to a floor, sidewalk, or parking lot, for example.

The stroller may further comprise a belly bar. In such embodiments, a belly bar attachment may be connected to the lower handle member. The belly bar is rotated in a position to be a carrying handle for the stroller 1 in its storage configuration as shown in FIG. 2.

As described, embodiments of the stroller may comprise a handle assembly; a front wheel assembly, wherein the front wheel assembly comprises at least one front wheel; a rear wheel assembly, wherein the rear wheel assembly comprises at least one rear wheel; and a folding pivot assembly, wherein the folding pivot assembly that cooperates to move the front wheel assembly toward the rear wheel assembly as the handle assembly is rotated from the in-use position to the storage position. The folding pivot assembly may comprise a handle assembly linkage, a front wheel assembly linkage, and a rear wheel assembly linkage. The stroller pivot assembly comprises a folding axis, wherein the stroller pivot assembly rotatably connects the handle assembly, the front wheel assembly, the handle assembly to rotate about the folding axis from an in-use position to a storage position and the stroller pivot assembly comprises a stroller locking assembly having an unlocked position and a locked position that retains the stroller in the stroller in-use position.

As used herein, "L-shaped" includes V-shaped, V-shaped where one leg is longer than the other leg, a curved shape similar to a J-shape or a U-shape, and similar shapes.

The embodiments of the described stroller and methods are not limited to the embodiments, components, method steps, and materials disclosed herein as such components, process steps, and materials may vary. Moreover, the terminology employed herein is used to describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be affected within the scope of the invention as defined in the appended claims. Accordingly, the scope of the various embodiments of the present invention should not be limited to the above discussed embodiments and should only be defined by the following claims and all equivalents.

The invention claimed is:

1. A stroller, comprising:
   a handle assembly, wherein the handle assembly comprises an upper handle member and a lower handle member and the upper handle member comprises a handle portion;
   a front wheel assembly; wherein the front wheel assembly comprises at least one front wheel;
   a rear wheel assembly; wherein the rear wheel assembly comprises at least one rear wheel;
   a handle pivot assembly, wherein the handle pivot assembly pivotally connects the upper handle member to the lower handle assembly, the upper handle member selectively rotatable about a handle axis point between an in-use position and a storage position, and handle pivot assembly comprises a locking assembly that retains the handle in the in-use position;
   a stroller pivot assembly, wherein the stroller pivot assembly rotatably connects the lower handle member of the handle assembly, the front wheel assembly, rear wheel assembly, the front wheel assembly and the rear wheel assembly may rotate from a stroller in-use position to a stroller storage position, and the stroller pivot assembly comprises a stroller locking assembly having an unlocked position and a locked position that retains the stroller in the stroller in-use position; and
   a folding pivot assembly, wherein the folding pivot assembly comprises a handle assembly linkage rotatably connected to the lower handle member, a front wheel assembly linkage, and a rear wheel assembly linkage, wherein rotation of the lower handle member by the force of gravity drives the handle assembly linkage to rotate the front wheel linkage and the rear wheel linkage to rotate the front wheel assembly toward the rear wheel assembly.

2. The stroller of claim 1, wherein rotation of the upper handle member about the handle axis point moves the stroller locking assembly from the locked position to the unlocked position.

3. The stroller of claim 2, wherein the upper handle rotates forward to move the stroller locking assembly from the locked position to the unlocked position.

4. The stroller of claim 1, wherein the handle assembly linkage comprises a belly bar attachment.

5. The stroller of claim 1, wherein the handle assembly linkage is rotatably connected to the rear wheel assembly linkage and the rear wheel assembly and the rear wheel assemble linkage is pivotally connected to the rear wheel assembly.

6. The stroller of claim 5, wherein the rear wheel assembly linkage is rotatably connected to front wheel assembly linkage.

7. The stroller of claim 6, wherein the rear wheel assembly linkage has an L-shaped portion.

8. The stroller of claim 7, wherein the rear wheel assembly linkage is an L-shaped linkage.

9. The stroller of claim 6, comprising a stroller seat and the folding pivot assembly comprises a stroller seat assembly linkage, wherein the stroller seat assembly linkage is rotatably connected to at least one of the front wheel assembly linkage and the rear wheel assembly linkage.

10. The stroller of claim 9, wherein the stroller seat assembly linkage comprises an L-shaped portion.

11. The stroller of claim 9, wherein the stroller seat assembly linkage is rotatably connected to the stroller seat.

12. The stroller of claim 11, wherein the stroller seat comprises a front portion and a rear portion and the stroller seat assembly linkage is rotatably connected to the rear portion of the stroller seat.

13. The stroller of claim 1, wherein the stroller is biased from the in-use position to the storage position by the force of gravity on the handle assembly.

14. The stroller of claim 13, wherein the force of gravity is not assisted or enhanced by mechanical biasing force.

15. The stroller of claim 1, wherein a longitudinal centerline of the lower handle member is offset from the axis.

16. A stroller, comprising:
    a handle assembly, wherein the handle assembly comprises an upper handle member and a lower handle member, and the upper handle member comprises a handle portion;
    a front wheel assembly; wherein the front wheel assembly comprises at least one front wheel;
    a rear wheel assembly; wherein the rear wheel assembly comprises at least one rear wheel;
    a handle pivot assembly, wherein the handle pivot assembly pivotally connects the upper handle member to the lower handle assembly, the upper handle member selectively rotatable about a handle axis point between an in-use position and a storage position, and handle pivot assembly comprises a locking assembly that retains the handle in the in-use position;
    a stroller pivot assembly, wherein the stroller pivot assembly rotatably connects the lower handle member of the handle assembly, the front wheel assembly, the rear wheel assembly, the front wheel assembly and the rear wheel assembly may rotate from an stroller in-use position to a stroller storage position, and the stroller pivot assembly comprises a stroller locking assembly having an unlocked position and a locked position that retains the stroller in the stroller in-use position; and
    a folding pivot assembly, wherein the folding pivot assembly comprises a handle assembly linkage, a front wheel assembly linkage, and a rear wheel assembly linkage, wherein rotation of the lower handle member by the force of gravity drives the handle assembly linkage to rotate the front wheel linkage and the rear wheel linkage to rotate the front wheel assembly toward the rear wheel assembly and wherein the handle assembly linkage comprises a belly bar attachment.

* * * * *